United States Patent
Mattei et al.

(10) Patent No.: US 10,738,464 B2
(45) Date of Patent: Aug. 11, 2020

(54) NON-LINEAR DYNAMIC ABSORBER AND USE THEREOF FOR ACOUSTIC INSULATION

(71) Applicants: SAINT-GOBAIN PLACO, Suresnes (FR); SAINT-GOBAIN ISOVER, Courbevoie (FR); CENTRE NATIONAL DE LA RECHERCHE SCIENTIFIQUE, Paris (FR)

(72) Inventors: Pierre-Olivier Mattei, Marseilles (FR); Sergio Bellizzi, Marseilles (FR); Marc Pachebat, Marseilles (FR); Remi Poncot, Paris (FR); Sylvain Berger, Paris (FR)

(73) Assignees: SAINT-GOBAIN PLACO, Suresnes (FR); SAINT-GOBAIN ISOVER, Courbevoie (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 452 days.

(21) Appl. No.: 15/517,190

(22) PCT Filed: Oct. 7, 2015

(86) PCT No.: PCT/FR2015/052690
§ 371 (c)(1),
(2) Date: Apr. 6, 2017

(87) PCT Pub. No.: WO2016/055733
PCT Pub. Date: Apr. 14, 2016

(65) Prior Publication Data
US 2017/0307041 A1    Oct. 26, 2017

(30) Foreign Application Priority Data
Oct. 9, 2014 (FR) .................................. 14 59688

(51) Int. Cl.
*E04B 1/82* (2006.01)
*E04B 2/74* (2006.01)
(Continued)

(52) U.S. Cl.
CPC .......... *E04B 1/8209* (2013.01); *E04B 2/7409* (2013.01); *F16F 7/104* (2013.01);
(Continued)

(58) Field of Classification Search
CPC .......... F16F 7/104; F16F 15/022; F16F 7/116; E04B 1/8209; E04B 2/7409; G10K 11/172; G10K 11/04
See application file for complete search history.

(56) References Cited

U.S. PATENT DOCUMENTS 4,286,642 A * 9/1981 Keatley ..................... F16F 1/36
                                                          29/453
4,442,647 A * 4/1984 Olsen ......................... B64C 1/40
                                                          244/119
(Continued)

FOREIGN PATENT DOCUMENTS

GB    2 265 669 A      10/1993
GB    2272744 A *     5/1994    .............. E04F 15/20
KR    10-1439421 B1    9/2014

OTHER PUBLICATIONS

International Search Report dated Feb. 8, 2016 in PCT/FR2015/052690 filed Oct. 7, 2015.

*Primary Examiner* — Jessie T Fonseca
(74) *Attorney, Agent, or Firm* — Oblon, McClelland, Maier & Neustadt, L.L.P.

(57) ABSTRACT

A building element includes a sheet of a rigid material and at least one nonlinear energy sink including a blade with two end parts and a nonlinear spring function intermediate part, a mass fixed to the nonlinear spring function intermediate part of the blade, and a fixing element allowing the two end
(Continued)

parts of the blade to be fixed to a solid support in such a way that the nonlinear spring function intermediate part can oscillate about its position of equilibrium or its positions of equilibrium. The nonlinear energy sink is fixed rigidly to the sheet by the fixing element. The building element can be contained in a partition wall. Additionally, such an energy sink or building element can be used for reducing the acoustic transparency of a wall.

16 Claims, 2 Drawing Sheets

(51) Int. Cl.
F16F 7/116 (2006.01)
G10K 11/172 (2006.01)
F16F 7/104 (2006.01)
F16F 15/02 (2006.01)
G10K 11/04 (2006.01)

(52) U.S. Cl.
CPC ............ *F16F 7/116* (2013.01); *F16F 15/022* (2013.01); *G10K 11/04* (2013.01); *G10K 11/172* (2013.01)

(56) References Cited

U.S. PATENT DOCUMENTS

| 7,093,814 B2* | 8/2006 | Meisel ............... F16F 1/44 248/562 |
| 7,647,744 B2* | 1/2010 | Payne, Jr. ............ E04B 1/82 24/458 |
| 8,973,330 B2* | 3/2015 | Egri, II ............ E04F 13/0805 248/231.81 |
| 2008/0008345 A1* | 1/2008 | Donaldson ........ E04B 2/7409 381/386 |
| 2008/0017780 A1* | 1/2008 | Downey ............. E04B 1/82 248/610 |
| 2009/0173029 A1* | 7/2009 | Socha ................ E04B 1/82 52/506.08 |
| 2009/0283359 A1 | 11/2009 | Ravnaas |
| 2013/0047523 A1 | 2/2013 | Chen et al. |
| 2014/0305736 A1* | 10/2014 | Gates ............... E04B 1/8209 181/284 |
| 2015/0361659 A1* | 12/2015 | Sessler ............. E04B 2/7457 52/483.1 |

\* cited by examiner

NON-LINEAR DYNAMIC ABSORBER AND USE THEREOF FOR ACOUSTIC INSULATION

BACKGROUND

The present invention relates to a nonlinear energy sink and to the use of same to improve the sound insulation between two spaces that are separated by a wall.

The sound insulation between two rooms that are separated by a wall is typically provided either by increasing the density of the wall or by lining said wall. In the case of two-leaf partition walls, a sound insulating material, typically a mat of mineral wool or an elastic foam, may be inserted in the airspace between the two sheets.

From an acoustic standpoint, such a two-leaf partition wall, whether or not it is lined with an insulating material, behaves at low frequency like a mass-spring-mass system in which the airspace or the filling of insulating material acts as the spring coupling the two sheets to one another. FIG. 1 shows how the sound reduction index (NF EN ISO 140-3) of such a two-leaf partition wall, with or without a filling of insulator, changes as a function of the frequency of the sound.

There is found to be a first characteristic weakness ($f_0$) at low frequencies (approximately 100-150 Hz), referred to as the "breathing" frequency, corresponding to movements of the system in phase opposition, and a second characteristic weakness ($f_c$) at high frequencies (between 2000 and 3000 Hz), referred to as the coincidence frequency, at which the wavelength of the incident sound wave "coincides" with the wavelength of the waves of flexing in the sheets.

BRIEF SUMMARY

It is an object of the present invention to reduce the acoustic transparency of walls, particularly two-leaf partition walls, in the low-frequency domain, namely at frequencies of between approximately 50 and 150 Hz, without adding an additional layer of sound insulation and without increasing the overall thickness of the partition wall.

This objective is achieved using a device of a modest size, fixed to the wall at a suitable point thereon, and which is capable of attenuating, or even of eliminating, the resonance of the wall at its breathing frequency by adapting to the intrinsic variations thereof. The physical phenomenon underpinning this attenuation of the resonance of the sheet is known by the name of energy pumping (or nonlinear targeted energy transfer) (See, for example, O. Gendelman et al., Energy pumping in non-linear mechanical oscillators, Part I and II, J. Appl. Mech., 68 (2001) 34-48).

Energy pumping is the name given to the irreversible transfer of vibrational energy from a main structure, generally a linear oscillator, to an auxiliary structure formed of an essentially nonlinear oscillator. The auxiliary structure, made up of a mass coupled to the main structure by a nonlinear spring, and, possibly, a damper, has no resonant frequency of its own and can oscillate at any frequency. Beyond a threshold for the vibrational energy of the main structure, the vibrational energy thereof is transferred to the auxiliary structure, thus attenuating the amplitude of the vibrations of the main structure.

The auxiliary structure, referred to as a nonlinear energy sink, abbreviated to NES (which is a nonlinear dynamic absorber of energy), is preferably significantly smaller in size than the main structure.

Energy pumping is already widely used in varied applications such as seismic protection of buildings and structures, improvement in dynamic performance of vehicles, or stabilization of shipping.

So far as the applicant company is aware the use of energy pumping for reducing the acoustic transparency of walls separating two spaces in a building or separating the inside of a building from the outside has never hitherto been considered.

The applicant company deserves the credit for having developed such a nonlinear energy sink that is at once simple, robust and lightweight and can easily be fixed to a sheet intended to act as a wall or partition wall, such as an element of a suspended ceiling, a floor tile, a leaf of a single-leaf or two-leaf partition wall, a lining element, etc.

The nonlinear energy sink of the present invention comprises, by way of essential element, a blade the two encastré ends of which are built into a support (so the ends are not free) and to which a small mass is fixed. In the event of dynamic loading, this blade behaves as a nonlinear spring, oscillating about its position of equilibrium—or about its positions of equilibrium—in a range of frequencies encompassing the loading frequency, thus allowing irreversible transfer of vibrational energy from the main resonator, namely the sheet to which the nonlinear sink is fixed, to the nonlinear energy sink.

One subject of the present invention is therefore a nonlinear energy sink comprising
- a blade with two end parts and a nonlinear spring function intermediate part,
- a mass fixed to the nonlinear spring function intermediate part of the blade,
- a fixing means allowing the two end parts of the blade to be fixed to a solid support in such a way that the nonlinear spring function intermediate part can oscillate about its position of equilibrium or its positions of equilibrium.

The nonlinear energy sink of the present invention therefore comprises three essential means:
- a fixing means for fixing the blade to the main structure the vibrations of which are to be attenuated,
- a blade with two non-free encastré ends built into the fixing means, and
- a small mass fixed to the "free" intermediate part of the blade which is situated between the two encastré end parts.

When this energy sink is subjected to vibration loading of sufficient energy and appropriate frequency, the small mass will oscillate in a plane perpendicular to the main plane of the blade, at a frequency different from the excitation frequency, the intermediate part of the blade then behaving like a nonlinear spring coupling the mass to the fixing means and to the main structure on which the energy sink is fixed.

The blade can be made of any rigid elastic material with a high Young's modulus, typically higher than 50 GPa, preferably higher than 60 and in particular higher than 70 GPa.

It is preferably a metal blade.

The mass is preferably fixed in the central part—more specifically the center third—of the nonlinear spring function intermediate part of the blade, although this position is not the only conceivable position and the mass could very well occupy an off-centered position.

The mass may be made from the same material as or different material from that of the blade. As with the blade, it is preferably a metallic material. It is, for example, conceivable for the mass and the blade to be formed as a single piece, the mass then corresponding to a bulge of the intermediate part of the blade.

The blade is preferably subjected to a stress, particularly a compressive or torsional stress. This stress results in a reduction in the stiffness of the spring that the thin blade forms. Tests conducted by the applicant company demonstrated that this stress also has the advantageous effect of lowering the threshold at which the energy pumping phenomenon begins and of increasing the effectiveness of the energy sink.

The blade is preferably not subjected to a tensile stress that could reduce or even eliminate the effectiveness of the nonlinear energy sink (probably by increasing the spring stiffness and the pumping threshold).

The compressive or torsional stress is preferably great enough to cause the blade elastic buckling, which means to say buckling that is reversible and disappears when the stress is relieved. In one preferred embodiment of the nonlinear energy sink of the present invention, the blade is subjected to a compressive stress that causes it elastic buckling.

A blade that has buckled, which means to say that has been subjected to a compressive stress in the plane of the blade, has two points of stable equilibrium, as opposed to a blade that has not been subjected to a compressive stress and which has just one point of stable equilibrium.

The elastic buckling of the blade must not be excessively high. This is because when the degree of buckling exceeds a certain amount, the transition between the two positions of stable equilibrium becomes too difficult and the nonlinear spring will then just oscillate about one single position of stable equilibrium.

The elastic buckling is advantageously less than 10%, preferably less than 6%, particularly less than 4%, this percentage being expressed with respect to the length of the nonlinear spring function intermediate part.

The buckling of the blade can also be expressed by indicating the ratio of the deformation to the thickness of the blade. In the nonlinear energy sink of the present invention, this ratio is preferably below 100, in particular below 50 and ideally below 30.

In one preferred embodiment of the nonlinear energy sink of the present invention, the fixing means consists of a single piece comprising two built-in means for rendering the end parts of the blade encastré. This embodiment is particularly advantageous when using a buckled blade, because it allows the compressive stress in the blade to be adjusted without the fixing means being attached to the main structure.

In theory, the fixing means could nevertheless be made up of two distinct components, each of these components having a built-in means for rendering one end of the blade encastré. Such an embodiment would entail adjusting the stress in the blade after the nonlinear energy sink had been fixed to the main structure the vibrations of which it is to attenuate.

The fixing means needs to be made of a material that is rigid enough to transmit the vibrations from the main structure to the nonlinear spring that the blade forms. It is preferably a polymer material of fairly high elastic modulus, typically higher than 1.5 GPa.

The means of fixing the nonlinear energy sink used for the tests conducted by the applicant company was ABS (acrylonitrile-butadiene-styrene). ABS is a complex two-phase material with a thermoplastic matrix (acrylonitrile-styrene) in which nodules of elastomer (butadiene) are dispersed. These nodules may play an important part in the dissipation of the vibrational energy of the nonlinear energy sink.

Another two-phase material of this type that could be particularly suitable for forming the fixing means is high impact polystyrene, a poly(styrene-b-butadiene) block copolymer with nodules of polybutadiene elastomer dispersed in a polystyrene matrix.

In one attractive embodiment of the invention, the fixing means is therefore formed of a two-phase polymer material comprising a rigid thermoplastic matrix (with high Young's modulus) and an elastomer phase (with low Young's modulus) dispersed in the thermoplastic matrix.

The energy sink of the present invention preferably has a plane of symmetry perpendicular to the longitudinal axis of the blade.

In one particularly preferred embodiment of the energy sink, the fixing means comprises two branches extending symmetrically from a common base. The two built-in means for rendering the end parts of the blade encastré are then situated respectively on the two branches, preferably at or near the end of each of the branches, in two positions that are symmetric with respect to one another.

The nonlinear energy sink may for example have the overall shape of a U, of a Y, or of a V, allowing fixing to the support at the base of the U, of the Y or of the V.

In one advantageous embodiment, the two built-in means are two jaws.

The mass fixed to the intermediate part advantageously has a weight of between 1 and 200 g, preferably between 2 and 100 g, in particular between 3 and 50 g, and ideally between 5 and 30 g.

The length of the intermediate part of the blade is advantageously between 1 and 50 cm, preferably between 3 and 30 cm and, in particular, between 5 and 20 cm.

The thickness of the intermediate part of the blade is advantageously between 0.05 mm and 5 mm, preferably between 0.1 and 3 mm, in particular between 0.5 and 2 mm.

Finally, the width of the intermediate part of the blade is advantageously between 1 mm and 50 mm, preferably between 2 mm and 30 mm, in particular between 5 and 20 mm.

The nonlinear energy sink built and tested by the applicant company and described in greater detail hereinafter comprises a blade the intermediate part of which is 12 cm long, 0.1 mm thick and 0.5 cm wide, with a 3 g mass fixed at its center.

As explained in the introduction, the nonlinear energy sink of the present invention is used to improve the sound insulation between two spaces which are separated by a wall comprising at least one sheet. This wall may separate the inside of a building from the outside, or alternatively may separate two rooms of a building, or of a rail, maritime, automotive or aeronautical means of transport.

This wall may be a building element in the form of a sheet, or alternatively may comprise several building elements each one comprising at least one sheet. The nonlinear energy sink is, in all instances, fixed via the fixing means directly to the sheet or sheets of the building element.

Another subject of the application therefore is a building element comprising
    at least one sheet made of rigid material, and
    at least one nonlinear energy sink as described hereinabove, fixed rigidly to the sheet by the fixing means of the energy sink.

A further subject of the application is a partition wall or wall, particularly a partition wall or wall of a building or of a rail, maritime, automotive or aeronautical means of transport, comprising such a building element with a nonlinear energy sink as described hereinabove. This partition wall or wall is preferably a two-leaf partition wall or two-leaf wall.

The Young's modulus of the rigid material that forms the sheet is typically higher than 0.1 GPa, preferably higher than 1 GPa, in particular higher than or equal to 3 GPa.

The sheet may be made of a material chosen for example from glass, concrete, metals, plaster board, plastics, wood or composite materials.

In a preferred embodiment, the building element will comprise at least one sheet of plasterboard.

In another preferred embodiment, the building element forms part of a two-leaf partition wall, which means to say comprises two sheets parallel to one another and separated by an intermediate space also referred to as an airspace. It is these double partition walls comprising two sheets coupled by an airspace that present problems of fairly high acoustic transparency in the low-frequency domain corresponding to the "breathing" frequency of the system. This problem with acoustic transparency is particularly pronounced when the two sheets are sheets of plasterboard, generally fixed to a framework of rails and/or uprights, preferably made of metal.

The intermediate space defined between the two sheets is preferably at least partially filled with a sound insulation material.

In general, the nonlinear energy sink is preferably fixed to the sheet in such a way that the plane of the blade of the energy sink is substantially parallel to the plane of the sheet.

The building element may comprise one or more nonlinear energy sinks. For obvious esthetic reasons, when the building element forms part of a two-leaf partition wall, the nonlinear energy sink is preferably fixed on at least one of the faces that face toward the inside of the double partition wall.

In the context of a plan to sound insulate an existing wall, the energy sink may, however, be fixed to a visible and readily accessible face of the wall.

In order to optimize the effectiveness of the nonlinear energy sink, the latter needs to be installed at a point on the sheet where the amplitude of sheet vibrations is at a maximum. This is because energy pumping does not begin until a certain threshold level of vibrational energy has been crossed and the main difficulty with using a nonlinear energy sink for sound insulation is that of getting this pumping threshold down as low as possible. The nonlinear energy sink therefore needs to be installed at the point on the sheet where the sheet vibrates the most. This point will usually be in the half of the surface of the sheet that is furthest from the fixed edges.

When the intermediate space of the two-leaf partition wall is filled with an insulating material, the nonlinear energy sink may be housed in a depression hollowed into the internal face of the sheet or in a depression hollowed into the insulating material so that it does not come into contact therewith. In another alternative form, the filling of the intermediate space with the insulating material may be an only partial filling and the nonlinear energy sink can be installed in the unfilled part.

A final subject of the present invention is the use of a nonlinear energy sink as described hereinbelow or of a building element containing such a nonlinear energy sink for reducing the acoustic transparency of a wall.

This use for example comprises a method for reducing the acoustic transparency of a wall separating two rooms of a building or separating the inside of a building from the outside, which involves fixing to said wall, preferably to a sheet of said wall, a nonlinear energy sink according to the present invention.

Of course, all the embodiments mentioned hereinabove with regard to the nonlinear energy sink or the building element comprising it likewise apply to the use of these objects for reducing the acoustic transparency of a wall.

BRIEF DESCRIPTION OF THE DRAWINGS

The present invention is now described in greater detail with reference to the attached figures in which.

DETAILED DESCRIPTION

Figure 1:
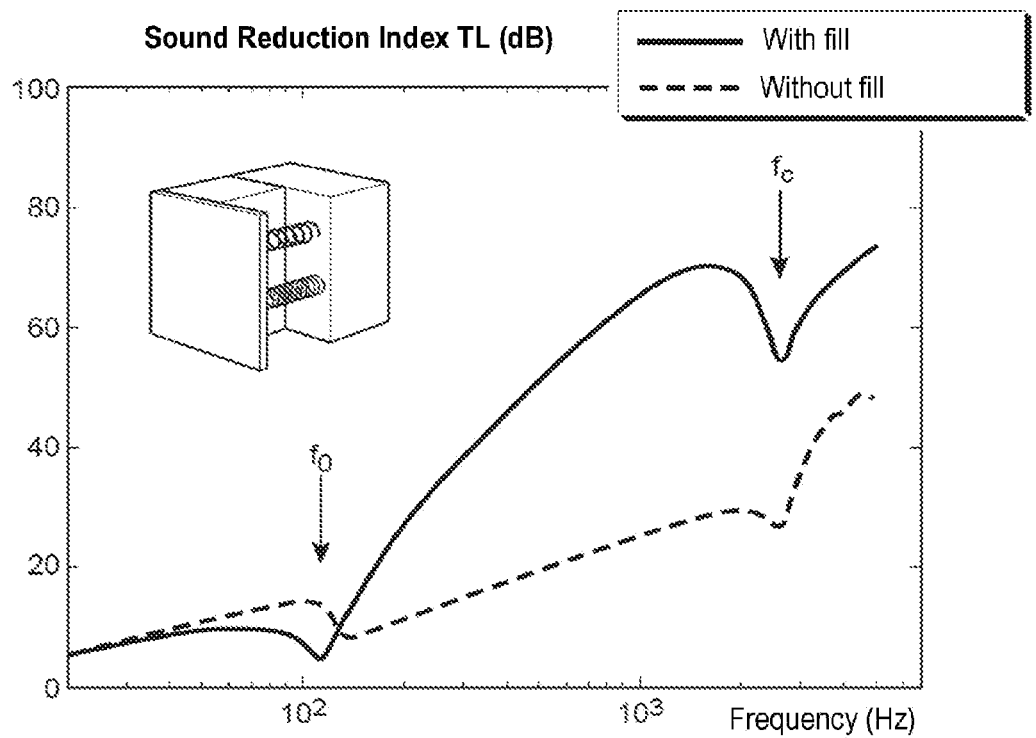
FIG. 1 is a graph showing how the sound reduction index of a two-leaf partition wall changes as a function of the frequency of the sound that is to be prevented from passing through the wall.

FIG. 1 has already been discussed in the introduction. It shows the technical problem that the present invention is addressing, namely the increased acoustic transparency ($f_o$) of a two-leaf wall at low frequencies (approximately 100-150 Hz), referred to as the "breathing" frequency, corresponding to the two sheets of a two-leaf wall resonating in phase opposition.

Figure 2:
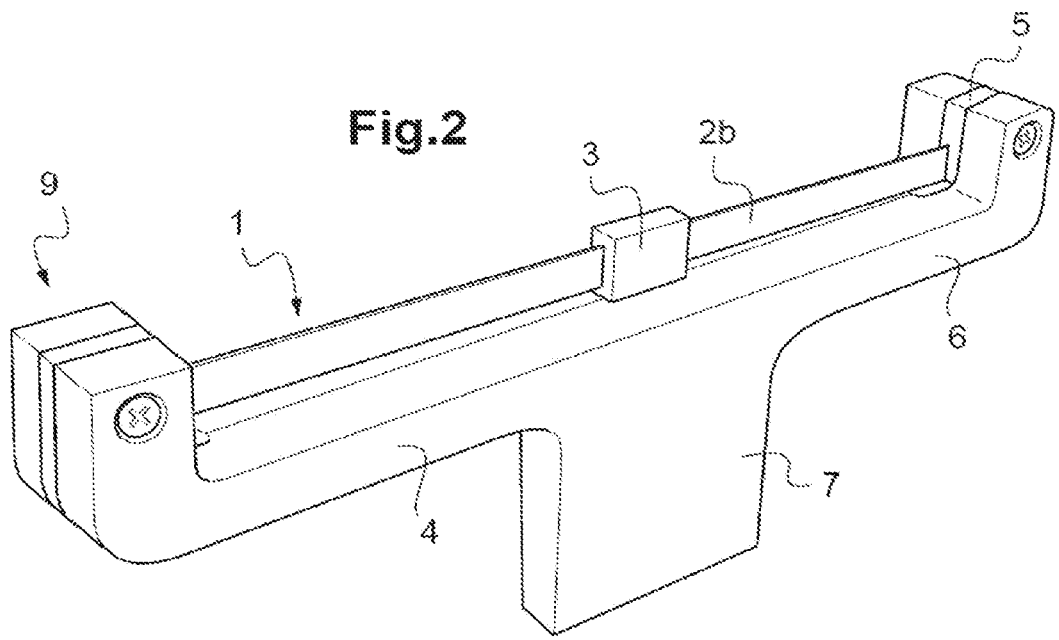
FIG. 2 is a perspective view of a nonlinear energy sink according to the invention.

The nonlinear energy sink 9 of the present invention, depicted in FIG. 2, has a fixing means 4 in the shape of a flattened Y. This fixing means is made up of a base 7 from which two branches 6 extend symmetrically. At the end of each branch 6 there is a built-in means 5 the clamping of which can be adjusted by means of a screw. The two built-in means 5 hold the two end parts (not visible) of a metal blade 1. The intermediate part 2b of the blade can vibrate freely when activated by the vibration of the main resonator (not depicted) on which the nonlinear energy sink 9 will be fixed. Fixed at the center of the blade 1 is a small mass 3.

Figure 3:
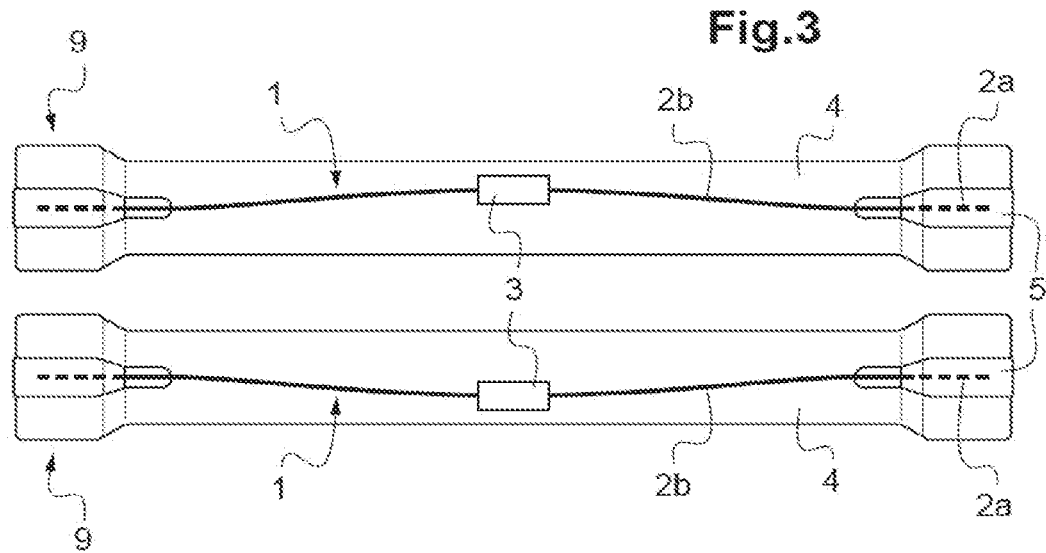
FIG. 3 is a view from above of the energy sink according to the invention of FIG. 2, showing the two positions of stable equilibrium of the nonlinear spring function blade.

FIG. 3 shows the same nonlinear energy sink the blade 1 of which is subjected to a compressive stress applied along the longitudinal axis of symmetry of the blade. This compressive stress is generated as a result of the fact that the intermediate part 2b of the blade comprised between the two encastré end parts 2a which are built-in into the built-in means 5 is longer than the distance separating the two built-in means. This compressive stress causes the blade 1 to buckle. Each of the two depictions shows a position of stable equilibrium of the buckled blade 1. During operation, which means to say when the nonlinear energy sink according to the invention is fixed rigidly to a sheet subjected to sufficient vibration, the blade can pass from one position of stable equilibrium to the other.

Figure 4:
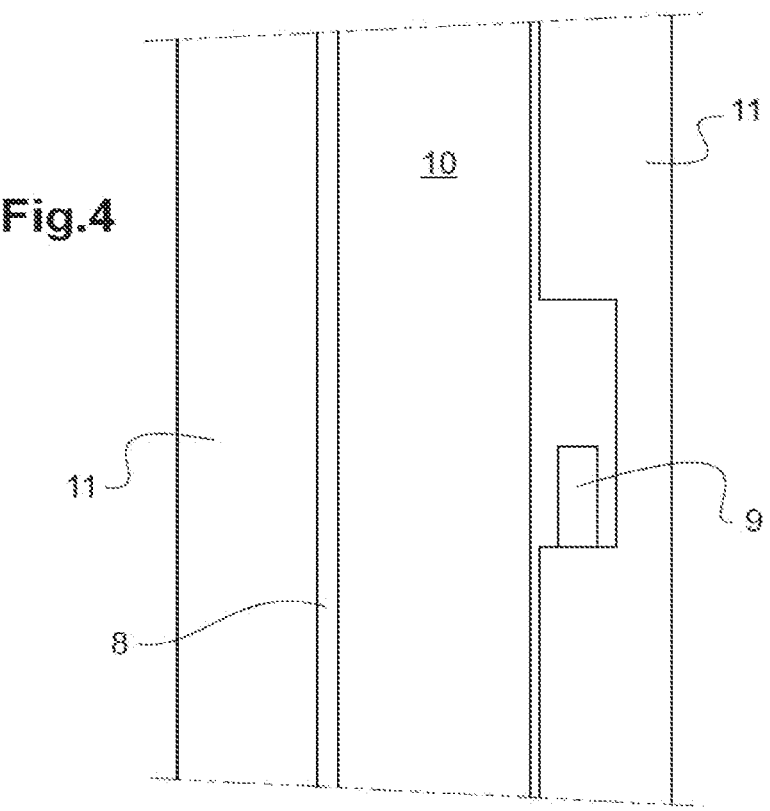
FIG. 4 shows a cross-section through a two-leaf partition wall comprising a nonlinear energy sink according to the invention.

Finally, FIG. 4 very schematically shows the nonlinear energy sink 9 according to the invention, fixed into a depression in a sheet 11 that forms part of a building element according to the invention. This building element in this instance is a two-leaf partition wall formed of two sheets 11 between which is defined an intermediate space 8 filled with an insulating material 10. The nonlinear energy sink is fixed to the sheet in such a way that the plane of the blade (not visible) is substantially parallel to the overall plane of the sheet 11.

The invention claimed is:

1. A building element to be subjected to vibrations, comprising:
    at least one sheet of a rigid material and at least one nonlinear energy sink comprising
        a blade with two end parts and a nonlinear spring function intermediate part,
        a mass fixed to the nonlinear spring function intermediate part of the blade, and
        a fixing means allowing the two end parts of the blade to be fixed within a solid support in such a way that the nonlinear spring function intermediate part can oscillate about its position of equilibrium or its positions of equilibrium,
    the nonlinear energy sink being fixed rigidly to the sheet by the fixing means,
    wherein the blade is subjected to a compressive stress from being fixed to the solid support that causes elastic buckling of the blade before the blade is subjected to the vibrations.

2. The building element as claimed in claim 1, wherein the elastic buckling is less than 10%, this percentage being expressed with respect to a length of the nonlinear spring function intermediate part.

3. The building element as claimed in claim 1, wherein the mass is fixed in a central part of the nonlinear spring function intermediate part of the blade.

4. The building element as claimed in claim 1, wherein the blade is a metal blade.

5. The building element as claimed in claim 1, wherein the fixing means consists of a single piece comprising two built-in means for rendering the end parts of the blade fixed.

6. The building element as claimed in claim 5, wherein the fixing means comprises two branches extending symmetrically from a common base, the two built-in means being situated respectively on the two branches.

7. The building element as claimed in claim 6, wherein the two built-in means are situated respectively at or near an end of each of the branches.

8. The building element as claimed in claim 1, wherein the nonlinear energy sink is fixed to the sheet in such a way that a plane of the blade of the sink is substantially parallel to a plane of the sheet.

9. The building element as claimed in claim 1, wherein the at least one sheet is a sheet of plasterboard.

10. The building element as claimed in claim 1, wherein the at least one sheet of the building element comprises two sheets that are parallel to one another and separated by an intermediate space.

11. The building element as claimed in claim 10, wherein the two sheets are sheets of plasterboard.

12. The building element as claimed in claim 11, wherein an intermediate space between the two sheets is filled with an acoustic insulation material.

13. The building element as claimed in claim 10, wherein an intermediate space between the two sheets is filled with an acoustic insulation material.

14. The building element as claimed in claim 1, wherein the building element is configured to reduce an acoustic transparency of a wall.

15. The building element as claimed in claim 1, wherein the nonlinear spring function intermediate part is longer than a distance separating the solid support in which the two end parts of the blade are fixed to subject the blade to the compressive stress before the blade is subjected to the vibrations.

16. A wall of a building comprising:
    the building element as claimed in claim 1.

* * * * *